Patented June 23, 1936

2,045,015

UNITED STATES PATENT OFFICE 2,045,015

PRODUCTION OF SULPHURIC DERIVATIVES OF FATTY ACID COMPOUNDS

Paul Koerding, Conrad Schoeller, and Heinrich Ulrich, Ludwigshafen-on-the-Rhine, Germany, assignors to I. G. Farbenindustrie Aktiengesellschaft, Frankfort-on-the-Main, Germany No Drawing. Application May 28, 1932, Serial No. 614,296. In Germany June 9, 1931

19 Claims. (Cl. 260—99.12)

The present invention relates to the production of assistants for the textile and allied industries.

It has already been proposed to prepare valuable assistants for the textile and allied industries by condensing fatty acids, particularly those containing at least 8 carbon atoms and especially fatty acids of vegetal, that is animal and vegetable origin, which, usually, contain at least 10 carbon atoms, or their derivatives such as the corresponding acid chlorides or esters, with amino sulphonic acids, such as taurine or amino sulphuric esters. Similarly, equally valuable products have been prepared by condensing fatty acids, or their derivatives, with hydroxy sulphonic acids or hydroxy sulphuric esters as for example isethionic acid or carbyl sulphate. If the amino or alcoholic components contain long aliphatic chains, the acid radicles may contain a few carbon atoms, as for example in acetic acid, care being taken only that the total number of carbon atoms is at least 8. In these processes compounds are obtained which correspond to the general formula R—CO—Z—R$_1$Y and more especially to the formulæ R—CO—N(X)—R$_1$Y and

R—CO—O—R$_1$Y in which R—CO denotes a radicle of a saturated or unsaturated fatty acid, which may or may not be hydroxylated, Z denotes nitrogen or oxygen, X denotes hydrogen or an organic radicle, that is an alkyl, cycloalkyl, aryl or aralkyl radicle, R$_1$ denotes an organic radicle, that is an alkyl, cycloalkyl, aryl or aralkyl radicle, and Y denotes a "sulphuric derivative radicle" selected from the group consisting of sulphuric ester radicles (—O—SO$_2$OH, or —O—SO$_2$O— alkali metal, respectively) and sulphonic acid radicles (—SO$_2$OH, or SO$_2$O— alkali metal, respectively). Methods for the production of such assistants are described for example in the British Patents Nos. 341,053, 343,899, 366,916 and 367,585 and the U. S. Patents 1,932,176, 1,932,179, 1,881,172 and 1,916,776.

We have now found that the value of assistants for the textile and allied industries, and particularly wetting, dispersing, cleansing and like agents, of the said types can be increased by introducing halogen into the said agents containing an aliphatic chain containing at least 8 carbon atoms, or by taking care during their preparation that the molecule of the final product contains at least one atom of halogen, preferably from 2 to 4 halogen atoms. In most cases chlorine and bromine will be employed for economic reasons but also iodine may be used. The quantity of halogen may be also increased so far that one atomic proportion of halogen may be present per two carbon atoms of the final product.

For example the procedure may advantageously be that so much halogen is introduced into the components employed for the condensation, i. e. the fatty acids or their derivatives and/or amino sulphonic acids or sulphuric esters or hydroxylated sulphonic acids or sulphuric esters that besides a reactive halogen atom which may take part in the condensation at least one further firmly combined halogen atom is present. Furthermore, the halogenation of already prepared wetting or like agents, of the said types, proceeds very smoothly and leads to the wetting or like agents containing halogen already described, the halogenation being preferably carried out in anhydrous inert solvents such as ethylene chloride or carbon tetrachloride.

Contrasted with the corresponding products which are free from halogen, the agents prepared according to this invention have in particular a considerably increased wetting, foaming, dispersing and cleansing power. They are furthermore distinguished throughout by an increased solubility in water, even in hard water, as well as in aqueous solutions of alkalies, acids and salts.

The following Examples will further illustrate the nature of this invention, but the invention is not restricted to these examples. The parts are by weight.

Example 1

Stearic acid chloride is converted into tetrachlorstearic chloride by leading chlordine therethrough at 90 C. 265 parts of the product are introduced while stirring into a solution of 100 parts of mono-ethanolamine sulphuric acid ester, obtainable by acting with chlorsulphonic acid on mono-ethanolamine at from 20° C. to 40 C. in the presence of ethylene chloride, and 50 parts of caustic soda in 440 parts of water at about 20° C. When the introduction is completed, the whole is stirred for an hour, after which the tetrachlorstearic monoethanol amide sulphuric acid ester ($C_{17}H_{31}Cl_4CO$—NH—$C_2H_4$—O—$SO_2$—OH) is present in the form of a 40 per cent aqueous paste which is eminently suitable for example as a washing agent in hard water.

If an equimolecular proportion of taurine ($NH_2$—$C_2H_4$—$SO_2OH$) be employed instead of the monoethanol amine sulphuric acid ester, a product is obtained which is a sulphonic acid and corresponds to the formula $C_{17}H_{31}Cl_4CO$—NH—$C_2H_4$—$SO_2OH$.

Example 2

370 parts of dichlor-stearic chloride (obtainable by chlorinating oleic acid chloride) are mixed with 160 parts of hydroxyethane sulphonic acid sodium salt and the mass gradually heated to 90° C. The reaction is completed when the product has become soluble in water. 450 parts of water are added to the mass and the remainders of hydrochloric acid are then neutralized with sodium carbonate. The product corresponds to the formula $C_{17}H_{33}Cl_2CO-O-C_2H_4-SO_2ONa$. A similar procedure is followed when dibromstearic chloride (obtainable in a corresponding manner) is employed instead of dichlorstearic chloride.

Example 3

30 parts of stearic mono-ethanol amide are converted into the corresponding mono-sulphuric ester ($C_{17}H_{35}CO-NH-C_2H_4-OSO_2OH$) by introducing into a solution of 30 parts of chlorsulphonic acid in 400 parts of ethylene chloride, the temperature being first kept at about 20° C. and then raised to 50° C. in the course of 2 hours. Chlorine is introduced into the solution until its weight is increased by 17 parts. The reaction product is then poured into a mixture of ice and water, rendered neutral with the aid of caustic alkali and freed from ethylene chloride by heating, the resulting emulsion of dichlor-stearic mono-ethanol amide sulphuric ester salt being evaporated to the desired concentration.

Example 4

300 parts of mono-chlor-stearic chloride are slowly introduced into a solution of 61 parts of mono-ethanolamine and 40 parts of caustic soda in 600 parts of water, while keeping the temperature at about 30° C. by cooling. The reaction mixture is then warmed to about 100° C. whereby the mono-chlor-stearic mono-ethanol amide separates out from the aqueous solution. The amide is separated and dried.

100 parts of the amide are introduced at about 30° C. into a solution of 60 parts of chlorosulphonic acid in 200 parts of ethylene chloride. After stirring for 2 hours, the reaction mixture is poured on 200 parts of ice whereupon the resulting chlor-stearic mono-ethanol amide sulphuric ester is rendered neutral with aqueous caustic soda solution and the ethylene chloride is distilled off. A solution is obtained which possesses a high scouring and dispersive power.

Example 5

80 parts of the acid sulphuric ester of mono-ethanol amine ($NH_2-CH_2-CH_2-O-SO_2OH$) and 47 parts of caustic soda are dissolved in 800 parts of water. 230 parts of di-brom-stearic chloride (obtainable by the action of bromine on stearic chloride at about 90° C.) are introduced at about 30° C. whereupon the reaction mixture is warmed to 60° C. for half an hour. And about 45 per cent paste of the sodium salt of di-brom-stearic mono-ethanol amide sulphuric ester $C_{17}H_{33}Br_2-CO-NH-C_2H_4-O-SO_2ONa$ is obtained. The product may find useful application in the textile industries as an emulsifying and scouring agent.

What we claim is:—

1. The process for improving the value of agents, suitable as assistants for the textile and allied industries and corresponding to the general formula $R-CO-Z-R_1Y$, in which $R-CO$ denotes a fatty acid radicle, $R_1$ denotes an alkylene radicle, Z denotes —O— or —N(X)— wherein X stands for hydrogen or a hydrocarbon radicle and Y denotes a sulphuric derivative radicle, selected from the group consisting of sulphuric ester and sulphonic acid radicles, which comprises reacting the said agents with a quantity of halogenating agent sufficient to introduce at least one halogen atom into each molecular proportion of the said fatty acid compounds.

2. Fatty acid compounds, suitable as assistants for the textile and allied industries, which correspond to the general formula $R-CO-Z-R_1Y$, in which $R-CO$ denotes a fatty acid radicle, $R_1$ denotes an alkylene radicle, Z denotes —O— or —N(X)— wherein X stands for hydrogen or a hydrocarbon radicle and Y denotes a sulphuric derivative radicle selected from the group consisting of sulphuric ester and sulphonic acid radicles and their alkali metal salts, and which contain a total number of at least 8 carbon atoms and at least one atomic proportion of halogen per each molecular proportion of fatty acid compound.

3. Fatty acid compounds, suitable as assistants for the textile and allied industries, which correspond to the general formula $R-CO-Z-R_1Y$ in which $R-CO$ denotes a fatty acid radicle, containing at least 8 carbon atoms, $R_1$ denotes an alkylene radicle, Z denotes —O— or —N(X)— wherein X stands for hydrogen or a hydrocarbon radicle and Y denotes a sulphuric derivative radicle, selected from the group consisting of sulphuric ester and sulphonic acid radicles and their alkali metal salts and which contain at least one atomic proportion of halogen per each molecular proportion of fatty acid compound.

4. Fatty acid compounds, suitable as assistants for the textile and allied industries, which correspond to the general formula $R-CO-O-R_1Y$ in which $R-CO$ denotes a fatty acid radicle, $R_1$ denotes an alkylene radicle and Y denotes a sulphuric derivative radicle, selected from the group consisting of sulphuric ester and sulphonic acid radicles and their alkali metal salts, and which contain a total number of at least 8 carbon atoms and at least one atomic proportion of halogen per each molecular proportion of fatty acid compound.

5. Fatty acid compounds, suitable as assistants for the textile and allied industries, which correspond to the general formula $R-CO-O-R_1Y$ in which $R-CO$ denotes a fatty acid radicle containing at least 8 carbon atoms, $R_1$ denotes an alkylene radicle and Y denotes a sulphuric derivative radicle selected from the group consisting of sulphuric ester and sulphonic acid radicles and their alkali metal salts and which contain at least one atomic proportion of halogen per each molecular proportion of fatty acid compound.

6. Fatty acid compounds, suitable as assistants for the textile and allied industries, which correspond to the general formula $R-CO-O-R_1Y$ in which $R-CO$ denotes a fatty acid radicle containing at least 8 carbon atoms, $R_1$ denotes an alkylene radicle, and Y denotes a sulphuric derivative radicle selected from the group consisting of sulphuric ester and sulphonic acid radicles and their alkali metal salts and which contain at least one atomic proportion of chlorine per each molecular proportion of fatty acid compound.

7. Fatty acid compounds, suitable as assistants for the textile and applied industries, which correspond to the general formula $R-CO-O-R_1Y$ in which $R-CO$ denotes a radicle of an acid selected from the group consisting of fatty acids of animal and vegetable origin, $R_1$ denotes an alkylene radicle and Y denotes a sulphuric derivative radicle, selected from the group consisting of sulphuric ester and sulphonic acid radicles and their alkali metal salts, and which contain at least one atomic proportion of chlorine per each molecular proportion of fatty acid compound.

8. Fatty acid compounds, suitable as assistants for the textile and allied industries, which correspond to the general formula $$R\text{---}CO\text{---}N(X)\text{---}R_1Y$$

in which R—CO denotes a fatty acid radicle, $R_1$ denotes an alkylene radicle, X denotes hydrogen or a hydrocarbon radicle, and Y denotes a sulphuric derivative radicle selected from the group consisting of sulphuric ester and sulphonic acid radicles and their alkali metal salts, and which contain a total number of at least 8 carbon atoms and at least one atomic proportion of halogen per each molecular proportion of fatty acid compound.

9. Fatty acid compounds, suitable as assistants for the textile and allied industries which correspond to the general formula $$R\text{---}CO\text{---}N(X)\text{---}R_1Y$$

in which R—CO denotes a fatty acid radicle containing at least 8 carbon atoms, R' denotes an alkylene radical, X denotes hydrogen or a hydrogen radicle, and Y denotes a sulphuric derivative radicle selected from the group consisting of sulphuric ester and sulphonic acid radicles and their alkali metal salts, and which contain at least one atomic proportion of halogen per each molecular proportion of fatty acid compound.

10. Fatty acid compounds, suitable as assistants for the textile and allied industries which correspond to the general formula $$R\text{---}CO\text{---}N(X)\text{---}R_1Y$$

in which R—CO denotes a fatty acid radicle containing at least 8 carbon atoms, R' denotes an alkylene radical, X denotes hydrogen or a hydrogen radicle, and Y denotes a sulphuric derivative radicle selected from the group consisting of sulphuric ester and sulphonic acid radicles and their alkali metal salts, and which contain at least one atomic proportion of chlorine per each molecular proportion of fatty acid compound.

11. Fatty acid compounds suitable as assistants for the textile and allied industries which correspond to the general formula $$R\text{---}CO\text{---}N(X)\text{---}R_1Y$$

in which R—CO denotes a radicle of an acid selected from the group consisting of fatty acids of animal and vegetable origin, X denotes hydrogen or a hydrocarbon radicle, $R_1$ denotes an alkylene radicle and Y denotes a sulphuric derivative radicle selected from the group consisting of a sulphuric ester and sulphonic acid radicles and their alkali metal salts and which contain at least one atomic proportion of chlorine per each molecular proportion of fatty acid compound.

12. Fatty acid compounds, suitable as assistants for the textile and allied industries, which correspond to the general formula $$R\text{---}CO\text{---}N(X)\text{---}R_1Y$$

in which R—CO denotes a radicle, an acid selected from the group consisting of fatty acids of animal and vegetable origin, $R_1$ denotes an alkylene radicle, X denotes hydrogen or a hydrocarbon radicle and Y denotes a sulphuric derivative radicle selected from the group consisting of sulphuric ester and sulphonic acid radicles and their alkali metal salts, and which contain at least one atomic proportion of chlorine per each molecular proportion of fatty acid compound.

13. Fatty acid compounds suitable as assistants for the textile and allied industries which correspond to the general formula $$R\text{---}CO\text{---}N(X)\text{---}R_1Y$$

in which R—CO denotes a radicle of an acid selected from the group consisting of fatty acids of animal and vegetable origin, $R_1$ denotes an ethylene radicle, X denotes hydrogen or a hydrocarbon radicle and Y denotes a sulphuric derivative radicle, selected from the group consisting of sulphuric ester and sulphonic acid radicles and their alkali metal salts, and which contain at least one atomic proportion of chlorine per each molecular proportion of fatty acid compound.

14. Taurides, suitable as assistants for the textile and allied industries, which correspond to the general formula $R\text{---}CO\text{---}N(X)\text{---}C_2H_4\text{---}Y$ in which R—CO denotes a fatty acid radicle, X denotes hydrogen or a hydrocarbon radicle and Y denotes a radicle of sulphonic acid in the free state or in the form of an alkali metal salt and which contain in the fatty acid radicle at least one atomic proportion of chlorine per each molecular proportion of fatty acid compound.

15. Fatty acid compounds, suitable as assistants for the textile and allied industries, which correspond to the general formula $$R\text{---}CO\text{---}O\text{---}R_1Y$$

in which R—CO denotes a radicle, an acid selected from the group consisting of fatty acids of animal and vegetable origin, $R_1$ denotes an ethylene radical and Y denotes a sulphuric derivative radicle, selected from the group consisting of sulphuric ester and sulphonic acid radicles and their alkali metal salts, and which contain in the fatty acid radicle at least one atomic proportion of chlorine per each molecular proportion of fatty acid compound.

16. Fatty acid compounds, suitable as assistants for the textile and allied industries, which correspond to the general formula $$R\text{---}CO\text{---}O\text{---}R_1Y$$

in which R—CO denotes a radicle, an acid selected from the group consisting of fatty acids of animal and vegetable origin, $R_1$ denotes an ethylene radicle and Y denotes a radicle of a sulphuric ester in the free state or in the form of an alkali metal salt and which contain in the fatty acid radicle at least one atomic proportion of chlorine per each molecular proportion of fatty acid compound.

17. Fatty acid compounds suitable as assistants for the textile and allied industries, which correspond to the general formula $$R\text{---}CO\text{---}Z\text{---}R_1Y$$

in which R—CO denotes the acid radicle of dichlorstearic acid, $R_1$ denotes an alkylene radicle, Z denotes —O— or —N(X)— wherein X stands for hydrogen or a hydrogen radicle, and Y denotes a sulphuric derivative radicle selected from the group consisting of sulphuric ester and sulphonic acid radicles and their alkali metal salts.

18. The fatty acid compound suitable as assistant for the textile and related industries from the group consisting of sulphuric ester and which corresponds to the formula

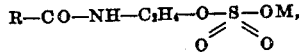

wherein R—CO stands for the acid radicle of dichlorstearic acid and M for hydrogen or an alkali metal.

19. The fatty acid compound suitable as assistant for the textile and related industries which corresponds to the formula

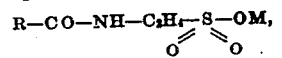

wherein R—CO stands for the acid radicle of dichlorostearic acid and M for hydrogen or an alkali metal.

PAUL KOERDING.
CONRAD SCHOELLER.
HEINRICH ULRICH.